July 11, 1950     A. M. SKELLETT     2,514,677
RADIO DISTANCE MEASURING SYSTEM WITH ALARM DEVICE
Filed Oct. 27, 1943     2 Sheets-Sheet 1
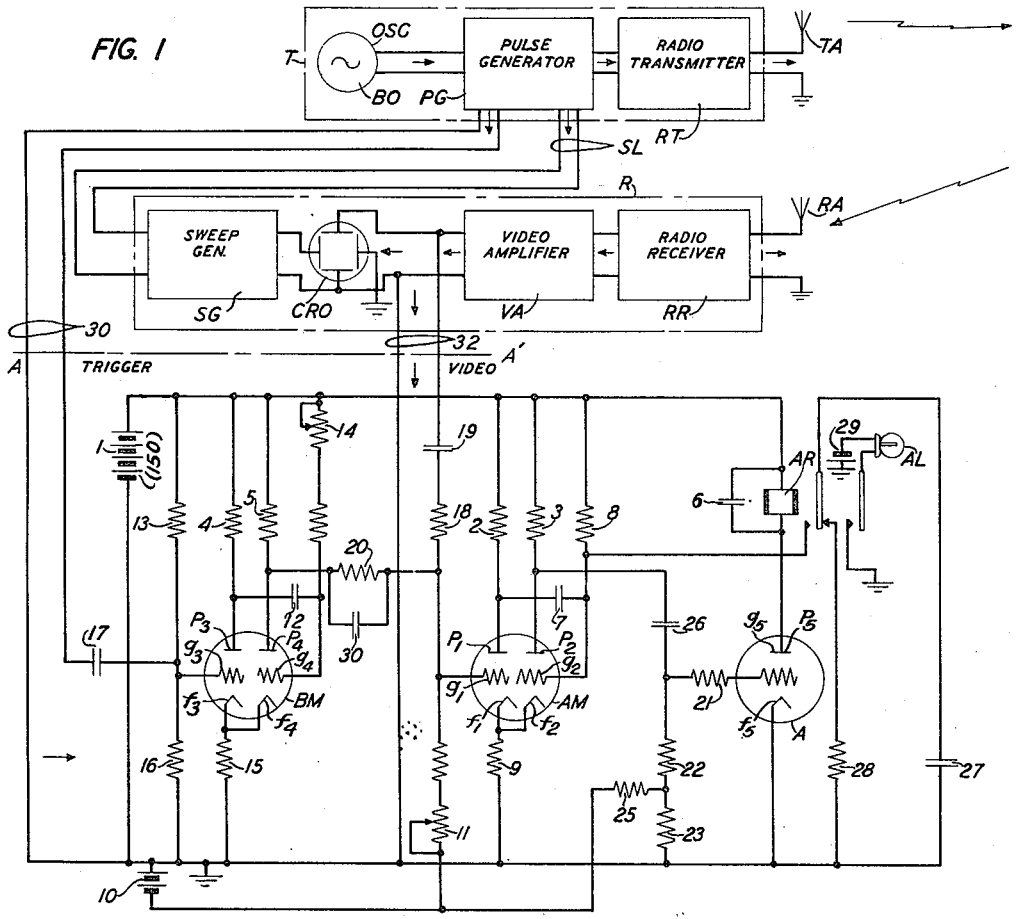
INVENTOR
A. M. SKELLETT
BY
*Earl C. Laughlin*
ATTORNEY

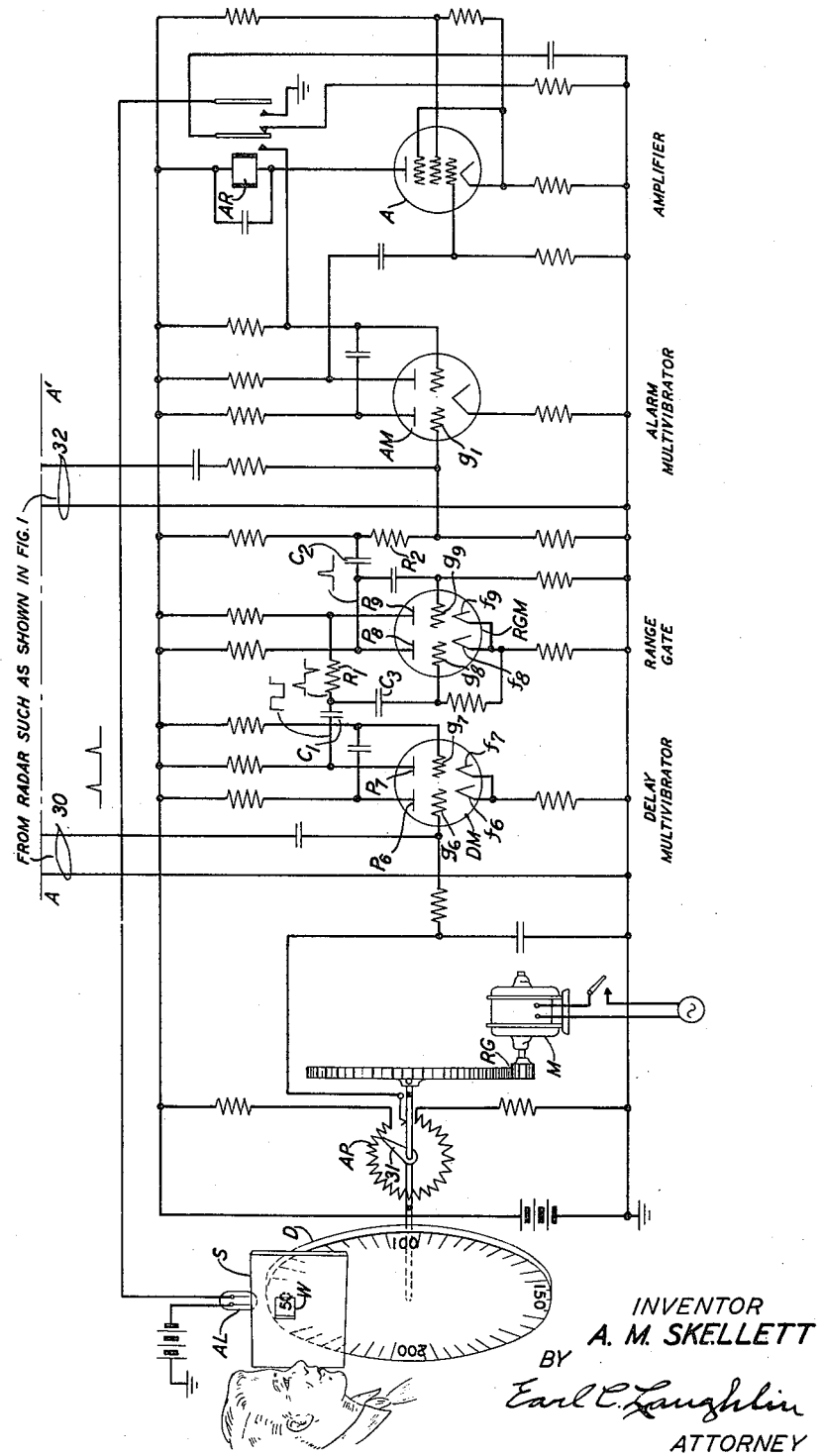

Patented July 11, 1950

2,514,677

UNITED STATES PATENT OFFICE 2,514,677

RADIO DISTANCE MEASURING SYSTEM WITH ALARM DEVICE

Albert M. Skellett, Madison, N. J., assignor to Bell Telephone Laboratories, Incorporated, New York, N. Y., a corporation of New York Application October 27, 1943, Serial No. 507,805

6 Claims. (Cl. 343—7)

The invention relates to object locating and distance measuring systems of the pulse reflection type, and particularly to automatic echo pulse alarm and range indicating circuits for use with such systems.

The invention will be described as applied to a pulse reflection type object locating and distance measuring system utilizing radio waves, commonly referred to as a "radar" system, but is applicable as well to similar systems utilizing other types of waves, such as compressional waves, i. e., so-called sound ranging systems.

The usual radar system includes a transmitting device adapted to radiate radio frequency pulses of very short duration at frequent intervals; a receiving device at the same location adapted for picking up and detecting return pulses, which may be termed radio echoes, reflected from certain objects (targets) to be located, on which the radiated pulses impinge; and a suitable indicator, which may be a cathode ray oscilloscope having its sweep synchronized with the period of the transmitted pulses, for causing the pattern of or indications representing the detected echoes in the order of their receipt to be displayed along a time axis on an indicating screen to provide a measure of the time interval elapsing between the emission of each radiated pulse and the receipt of the corresponding echo at the observation point, which time interval may be translated into proportional distance units on the time axis to indicate the distance from the receiver of the objects producing the echoes.

When such a system is in use, it frequently happens that no echo is received in the searching range for a long interval of time. With the usual equipment of this type, the operator must continually focus his attention on the indicator screen so as not to miss an echo when one is received.

An object of the invention is to overcome this disadvantage.

A more specific object is to provide automatically a visual or audible signal, or both, to attract the attention of the operator of a pulse reflection type object locating and distance measuring system when an indication representing an echo from an object within a given range appears on the indicator screen, and thus to free his attention at other times.

Another object is to automatically indicate to the operator of such a system the range of an object when an indication of a signal echo pulse reflected therefrom appears on the indicator screen.

In accordance with the invention, there is associated with the receiver of such a system an automatic alarm arrangement which is adapted to discriminate between received signal echoes and noise peaks of equivalent amplitudes mainly on the basis of the relative randomness of the noise peaks compared to a series of echo pulses.

In one embodiment, the automatic echo alarm arrangement includes an "alarm" multivibrator which is triggered off by all waves in the output of the detector in a radar receiver, of amplitudes above a given threshold value, whether they are signal echoes or noise peaks; an amplifier driven by that multivibrator so as to produce an average output current which is proportional to the frequency of operation of the alarm multivibrator; a relay circuit in the output of the amplifier, of such constants that it will operate to actuate an alarm device in response to the amplifier output current produced by multivibrator operation at the signal pulse frequency but will remain unoperated in response to the amplifier output current produced by multivibrator operation at lower frequencies such as would occur in response to the relatively random noise peaks; and another "blanking" multivibrator controlled from the pulse transmitter, operating to control the sensitivity of the alarm multivibrator so as to effectively prevent alarm indications in response to the portion of each transmitted pulse that gets through the receiver, and other unwanted signals.

In a modified arrangement in accordance with the invention, auxiliary apparatus including a "range gate" associated with the alarm multivibrator provides an automatic indication of the "range" of an object causing an echo when the alarm device operates to indicate to the operator the presence of an indication representing that echo on the indicator screen.

The various objects and features of the invention will be better understood from the following detailed description when read in conjunction with the accompanying drawings, in which:

Fig. 1 shows schematically an echo alarm arrangement in accordance with the invention applied to a radar system;

Fig. 2 is a curve showing the number of noise peaks per second with amplitude greater than the signal to noise ratio S for a band width of 2 megacycles, which is used in the derivation of the theoretical formula; and Fig. 3 shows schematically a modified arrangement in accordance with the invention providing in addition to an automatic echo alarm an automatic indication of the range of the object causing the echo.

The radar system of Fig. 1, shown in block diagrammatic form, to which the circuits of the invention are applied, consists of a transmitter T supplying short pulses of ultra-high frequency to the transmitting antenna TA for radiation; and a receiver R at the same location for receiving from the receiving antenna RA the return pulses (radio echoes) reflected from distant objects (targets) to be located, on which the radiated pulses impinge. The period of the radiated pulses is so chosen as to be equal to the total time required for a wave to pass from the transmitter T to an object at the limit of the range over which the system can operate, and the reflected wave to return from that object to the receiver R, and the duration of the transmitted pulses are usually made very short compared with that period. The transmitting antenna TA or the receiving antenna RA, or both, may be of the highly directive type. Instead of separate antennas as illustrated, a common antenna may be provided for transmitting and receiving, in which case an automatic transmit-receive switch would be employed to effectively block the transmitted pulse from the receiver during the pulse transmitting intervals.

The radiated pulses may be produced by keying the radio transmitter RT from the output of a suitable pulse generator PG energized from the base frequency oscillator BO of any suitable frequency. The receiver R for the return pulses or echoes includes the radio receiver RR, which may be of the double detection superheterodyne type, fed from the receiving antenna RA, followed by the video amplifier VA and the cathode-ray oscilloscope CRO. The sweep deflection plates of the oscilloscope CRO are supplied with a sawtooth timing wave from the sweep generator SG, the sweep of which is automatically synchronized with the period of the transmitted pulses by a synchronizing voltage received over the leads SL from the transmitting pulse generator PG, in well-known manner.

The circuits of the invention as shown in Fig. 1 include as main elements, the alarm multivibrator AM, the blanking multivibrator BM, the vacuum tube amplifier A, the alarm relay AR and the alarm lamp AL. The multivibrators AM and BM are of the well-known "start-stop" type, each utilizing two electron discharge amplifying devices retroactively coupled in an unsymmetrical arrangement. As shown, the two electron discharge amplifying devices in each multivibrator may comprise two amplifying triodes in a single tube, such as the RCA 6J6 miniature double triode. The cathodes or filaments $f_1$ to $f_4$ of the two multivibrator triodes and the cathode $f_5$ of the amplifier tube A may be heated to incandescence from a single source (not shown) which may be a direct current battery. Space current is supplied from the common plate battery 1 in parallel to the two plates $p_1, p_2$ of the multivibrator AM through the individual series resistors 2 and 3; to the two plates $p_3, p_4$ of the multivibrator BM through the individual resistors 4 and 5; and to the plate $p_5$ of the 3-electrode amplifier tube A through the winding of the alarm relay AR, which is shunted by the condenser 6.

The plate $p_1$ of the left-hand triode of multivibrator AM is coupled directly to the control grid $g_2$ of the right-hand triode of that multivibrator through the series condenser 7, but there is no such cross-coupling between the plate $p_2$ of the right-hand triode and the control grid $g_2$ of the left-hand triode of that multivibrator. The control grid $g_2$ of the right-hand triode of multivibrator AM is connected through the series resistor 8 to the positive terminal of the plate battery 1. The control grid-cathode circuit of the left-hand triode of multivibrator AM includes the common cathode resistor 9 for the two triodes, the negative grid biasing battery 10 and the variable resistor 11 in series.

Similarly, the plate $p_3$ of the left-hand triode of the multivibrator BM is directly coupled to the control grid $g_4$ of the right-hand triode of that multivibrator through the series condenser 12, but there is no such cross-coupling between the plate $p_4$ of the right-hand triode and the control grid $g_3$ of the left-hand triode of that multivibrator. The control grid $g_3$ of the left-hand triode of multivibrator BM is connected through the series resistor 13 to the positive terminal of the plate battery 1, and through the series resistor 16 to ground so that it is maintained at a constant potential by virtue of the potentiometer action of these two resistors. The control grid $g_4$ of the right-hand triode of that multivibrator is connected through the series variable resistor 14 to the positive terminal of plate battery 1. The cathode circuit of the two triodes of multivibrator BM includes the common cathode resistor 15 between the cathodes $f_3, f_4$ connected together and ground.

A "trigger" input for the blanking multivibrator BM is provided by connections 30 from the transmitting pulse generator PG of the radar system through the series condenser 17 to the control grid-cathode circuit of the left-hand (input) triode of that multivibrator, and a "trigger" input for the alarm multivibrator AM is provided by connections 32 from the output of video amplifier of the radar receiver through the resistance 18 and condenser 19 in series to the control grid circuit of the left-hand (input) triode of that multivibrator. The plate $p_4$ of the right-hand (output) triode of the multivibrator BM is connected through the series resistor 29 and condenser 30 in parallel with it to the control grid $g_1$ of the alarm multivibrator AM.

The control grid-cathode circuit of the three-electrode amplifier tube A includes the resistors 21, 22 and 23 in series. The amplifier A is normally biased to cut-off by a negative voltage applied from the 55-volt battery 10 through the resistors 25, 22, and 21 in series to its control grid $g_5$. The plate $p_2$ of the right-hand (output) triode of the alarm multivibrator AM is connected through the condenser 26 and resistor 21 to the control grid $g_5$ of the amplifier tube A.

The condenser 27 and resistor 28 in series are short-circuited through normally closed contacts of the alarm relay AR in the plate circuit of the amplifier tube A with that relay in the normal unoperated condition, and an energizing circuit for the alarm lamp AL from battery 29 and a charging circuit for condenser 27 from plate battery 1 through resistor 8 are broken at other contacts of the relay AR when it is unoperated.

The operation of the arrangement of the invention as shown in Fig. 1 will now be described. It is assumed that the transmitter T of the radar system is turned on so that radio pulses of very short duration are being sent out at frequent intervals from the transmitting antenna TA. When these radio pulses impinge on an object or target in their path, they will be reflected back to the observation point and will be picked up along with the accompanying noise waves by the receiving antenna RA. The receiving signal echoes and noise waves will pass from the antenna RA through the radio receiver RR in which they will be amplified and detected, and the detected waves will be further amplified by the video amplifier VA. The main portion of the waves in the output of the video amplifier VA will pass to the signal deflection plates of the cathode-ray oscilloscope CRO which will operate in well-known manner to cause the pattern of the detected signal echoes or indications representing them in the order of their occurrence to be displayed along a time axis on the oscilloscope screen.

A portion of the detected signal echoes and noise waves in the output of the video amplifier VA will be fed through the trigger input circuit of the alarm multivibrator AM to the control grid circuit of the input triode of that multivibrator at a level of from one to two volts. The variable resistor 11 in the control grid circuit of that input triode will be adjusted to vary the sensitivity or threshold of operation of the alarm multivibrator, to the desired operating value. The level of the applied video signals may be adjusted to the proper value by varying the gain of the intermediate frequency amplifier in the receiver RR. This level is set up by the operator until the alarm lamp AL is operated in response to the noise waves alone applied to the multivibrator AM, and is then retracted until the alarm lamp AL just ceases to light up.

In the alarm multivibrator AM as described above, the right-hand (output) triode is normally conducting and the left-hand (input) triode is normally biased to cut-off. The alarm multivibrator AM will be triggered off by all pulses applied from the output of the video amplifier VA above the threshold level of that multivibrator, whether they are noise peaks or echoes. The trigger input suddenly raises the potential of the control grid $g_1$ of the input triode so that the latter starts to conduct immediately. This action causes the plate potential to drop, which in turn forces the potential of the control grid $g_2$ of the output triode down through the coupling condenser 7. This lowers the current flow through the output triode and hence the current through the common cathode resistor 9 dropping the cathode potential of that triode. This action is very sudden and effectively decreases the grid bias on the output triode and hastens the transfer of the discharge from the output triode to the input triode through this regenerative action. In this case, the cathode resistor 9 acts to provide positive feedback.

This action continues at a very fast rate until the discharge has transferred to the input triode. The condenser 7 then starts to discharge through resistor 8 and in so doing gradually brings the potential of the right-hand grid $g_2$ up to its critical or cut-off value with respect to the cathode potential. When it reaches this critical value the output triode starts to conduct. This increases the current flow through the common cathode resistor 9 increasing the bias on the input triode, and through the same action as described above, but in the opposite sense, the discharge quickly transfers to the control grid $g_2$ of the output triode to remain there until the next trigger pulse comes along.

The duration of the pulse thus generated in the anode-cathode circuit of the output triode of the multivibrator AM is determined approximately by the time constant of the coupling condenser 7 and the associated resistance 8. The plate $p_2$ of the output triode of the multivibrator AM generates a positive square wave when the multivibrator operates, and this wave is fed to the control grid $g_5$ of the amplifier A through the condenser 26 and the resistance network in the control grid circuit of that tube. The normal bias for the amplifier tube A applied to the control grid $g_5$ from the biasing battery 10 is negative, and with the particular tube used, the constants of the circuit elements in its grid biasing circuit were made such that the bias was equal to 8.2 volts which was greater than the cut-off potential of the amplifier tube A. The large resistor 21 in series with the control grid $g_5$ of the amplifier tube A prevents its grid potential from rising appreciably above zero when the multivibrator AM operates.

The positive pulses thus applied to the control grid $g_5$ of the amplifier A from the output of the multivibrator AM in response to the signal echoes or noise peaks applied to the input of the latter will drive the amplifier grid to zero bias so as to produce an average amplifier output current passing through the winding of the alarm relay AR in the plate-cathode circuit of that tube, which is proportional to the frequency of operation of the multivibrator AM. By proper design of the relay AR and the shunting condenser 6, that relay is made too sluggish to follow individual multivibrator operations and, therefore, it integrates or averages the multivibrator output. The circuit constants are made such that the relay AR will operate in response to the amount of amplifier-output current passing through its winding provided by alarm multivibrator operation at the signal pulse frequency, and will remain unoperated for multivibrator operation at lower frequencies such as would be caused by the relatively random applied noise peaks.

While searching for an echo, the operator will adjust the output of the radar receiver so that, although the alarm multivibrator is continuously operated by noise peaks, there will be fewer such operations than the pulse frequency, and the alarm relay AR in the output of the amplifier A, therefore, does not operate. When an echo comes in, the multivibrator AM will be operated at the pulse frequency which will cause sufficient output current for the amplifier A to operate the alarm relay AR.

With the particular alarm circuit in accordance with Fig. 1 which has been built and tested, the circuit constants were selected so that at a pulse rate of 1,000 cycles the alarm relay AR will operate on the fifth echo in a group, i. e., its operate time was made 5 milliseconds.

When the alarm relay AR operates its normally open right-handed contacts are closed to complete an energizing circuit from battery 29 for the alarm lamp AL, causing it to light up to indicate to the operator the presence of an echo indication on the screen; its normally closed middle contacts are opened to break the short-circuiting connection through resistor 28 across the terminals of the condenser 27; and then its normally open left-hand contacts are closed to connect the ungrounded side of condenser 27 to the control grid $g_2$ of the output triode of alarm multivibrator AM and to the positive terminal of the plate battery 1 through series resistor 8. This suddenly pulls the potential of the control grid $g_2$ of the output triode of the alarm multivibrator AM down to zero level to render that multivibrator inoperative which effectively blanks out the operation of the alarm, and causes the condenser 27 to be slowly charged up from the plate battery 1 through the resistor 8. The reduction of the grid potential of the output triode of multivibrator AM raises the potential of the plate $p_2$ of that triode to that of the voltage supplied by the plate battery 1 (150 volts in this case) by cutting off current flow through that triode. Through the condenser 26, the control grid potential of the amplifier tube A is also raised so that the alarm relay AR in the output of that tube is held up. The latter condenser then starts to charge up through the associated resistor network and the amplifier tube A, and finally in so doing it drives the grid potential of that amplifier to the point where the current through the tube is no longer sufficient to hold the alarm relay AR operated.

When the relay AR releases, the opening of its left-hand contacts causes the control grid $g_2$ of the output triode of the multivibrator AM to be disconnected from the condenser 27 and that grid quickly regains its normal potential thus effectively transferring the discharge in the multivibrator AM to the right-hand (output) triode. The plate $p_2$ of the right-hand (output) triode then drops in potential driving the control grid $g_5$ of the amplifier tube A further negative thus insuring that the alarm relay AR in the output of that amplifier will be released. The release of the alarm relay AR by reclosing its middle contacts causes the condenser 27 to be quickly discharged through the resistor 28, and the discharge of the condenser 26 more gradually brings the sensitivity of the amplifier tube A back to normal. All of these operations happen in a time interval which is only a fraction of the radar receiving antenna scanning period, so that when the alarm operates in response to a group of signal echoes applied to the input triode of the alarm multivibrator AM, the alarm circuit is returned to the unoperated condition in readiness for the next group of echoes well before that group is received.

The alarm lamp AL thus flashes at the radar receiving antenna scanning rate when an echo is received. This type of alarm relay operation, as will be pointed out later in connection with a discussion of the theory of operation of the circuit, based on a statistical treatment of noise from which the minimum signal-to-noise ratio for the echoes is calculated, also allows the margin of operation of the alarm circuit to be set as close as desired.

The blanking multivibrator BM is utilized to prevent operation of the alarm lamp AL in response to the remnant of each transmitted pulse directly picked up by the radar receiving antenna RA, which gets through the receiver R, and by other unwanted signal echoes received from known objects outside the desired range of operation of the system, such as the sea return or echoes reflected from a coast line when searching over water. The blanking multivibrator BM is set off by a positive trigger pulse from the transmitting pulse generator PG of the radar transmitter applied through the series condenser 17 to the control grid circuit of the left-hand (input) triode of that multivibrator, whenever that generator causes an outgoing radio pulse to be sent out from the transmitting antenna TA. The blanking multivibrator BM operates in a manner similar to that of the alarm multivibrator AM described above, to generate and transmit through the series resistor 20 to the control $g_1$ of the input triode of the alarm multivibrator AM, a 5-volt negative blanking pulse. The effect of that pulse is to bias the multivibrator AM to cut-off during the intervals of its application and thus to prevent operation of the alarm lamp AL during this blanking interval. The duration of the blanking pulse and therefore of the alarm blanking interval may be suitably controlled by adjustment of the variable resistance 14 in the grid circuit of the output triode of the blanking multivibrator BM. With the circuit constants suitably chosen, the duration of the blanking interval may be adjusted between the limits of about 37 and 97 microseconds corresponding roughly to a range interval of 3.5 to 9 miles, thus preventing operation of the alarm by the directly received transmitted pulses and by echoes from known objects within that range.

Although the alarm device is shown in Fig. 1 as a lamp which is lighted under control of the alarm relay AR, it is apparent that the operation of that relay may be utilized to actuate any suitable audible alarm device, or both a visual and an audible alarm. For example, in place of the battery 29 and alarm lamp AL there might be connected a tone generator and a loud speaker or head phones, respectively, so that when the right-hand contact of relay AR closes an audible warning is given instead of the visual one. Of course, both types of alarms could be used together.

*Theoretical minimum signal-to-noise ratio*

From the above description of the echo alarm circuit of the invention shown in Fig. 1, it is evident that the minimum signal-to-noise ratio for positive operation of the alarm will depend on the frequency of operation of the multivibrator by the noise. It will be assumed that the noise at the input of the alarm circuit has the characteristics of thermal noise, that is to say, the energy follows a Maxwell-Boltzman distribution or that the energy distribution follows the error function.

It may be shown (see the article by W. G. Landon, in the Proceedings of the I. R. E., pages 29, 50, February 1941) that the probability P that the instantaneous noise voltage will be above an arbitrary value V is $$P = \frac{1}{E\sqrt{2\pi}} \int_V^\infty \exp\left(\frac{-V^2}{2E^2}\right) dV \qquad (1)$$

where E is the R. M. S. value of the noise voltage. Setting $$r = \frac{V}{E}$$

this equation may be rewritten in terms of the error function, erf. as follows:

$$P = \frac{1}{2}\left[1 - \mathrm{erf}\left(\frac{r}{\sqrt{2}}\right)\right] \qquad (2)$$

Now, the band width should be chosen wide enough to get the maximum amplitude for the echoes and yet as narrow as possible to cut down the frequency of the noise peaks and the average level of the noise. On the average the noise peaks may be assumed to have a duration equal to that of an echo because of this choice of band width. Half of these peaks will be positive and half will be negative so that if only positive pulses are considered, it may be assumed that there will be $\frac{1}{2}t$ of them per second, where $t$ is the duration of an echo. The band width, therefore, would be $2/t$ cycles wide.

Equation 2 above gives also the fraction of the time that the noise voltage is above the value V. If there are $\frac{1}{2}t$ noise peaks per second on the average, the number N of peaks with amplitudes greater than V may be taken to be $$N = \frac{1}{4}t\,(1 - \mathrm{erf}\,\sqrt{S}) \qquad (3)$$

where $$\sqrt{S}$$

is the ration of the R. M. S. values of V and E, assuming that a noise peak has a wave shape similar to that of an echo. Then S is the signal-to-noise ratio of an echo which has a peak amplitude of V.

Equation 3 is valid only if the noise peaks are rectangular in form and thus needs correction especially at the higher values of S. This correction may be made by assuming that the shape of a noise peak follows a sine function. If a peak exceeds the value V by only a small amount, the fraction of time the noise voltage is above this value is correspondingly smaller than for a rectangular pulse, and there will be more peaks needed to satisfy the requirements of Equation 2. Using graphical methods, the average height of the peaks above the level V is ascertained, and from this the duration of a pulse at this level and hence the correction factor is found.

The curve of Fig. 2 is a plot of values obtained in this way for a value of $t$ equal to 1 microsecond. From that curve, the number of noise peaks whose energy exceeds the average energy of the noise by the values plotted as abscissae in decibels may be found. This is also the signal-to-noise ratio of the peaks.

The equation for the curve of Fig. 2 turns out to be $$N = \frac{1}{2t} e^{-S} \qquad (4)$$

The points marked by the small crosses were calculated from this equation. Thus, the assumption is justified that the energy (or signal-to-noise ratio) distribution of the peaks follows the simple exponential function. We may write therefore $$P' = e^{-S} \qquad (5)$$

where P' is the probability that a noise peak will have a signal-to-noise ratio greater than S. It is also the fraction of the total number of peaks which exceed the value S.

We will define an interval of time $b$ such that it is the difference between the duration of the square wave of the alarm multivibrator and the pulse period. From the preceding we find that the number of noise peaks of positive sign per second is equal to $$\frac{f}{4}$$

where $f$ is the band width of the system. There will be $$\frac{bf}{4}$$

noise peaks of one sign in the interval $b$, and the number of these peaks above the threshold value S is $$\frac{bf}{4} e^{-S}$$

which we set equal to one for the limiting condition that operation on noise alone is just equal to operation by an echo.

Solving for the signal-to-noise ratio S, it is found that $$S = \frac{V_s^2}{V_n^2} = -\log_e \frac{4}{bf} \qquad (6)$$

where $V_s$ is the signal voltage and $V_n$ is the noise voltage.

For example, let $b$ equal 110 microseconds with the pulse repetition frequency, $n = 2000$ per second and the band width $f = 2$ megacycles. Then the minimum signal-to-noise ratio is 6 decibels.

Relays of the usual electromagnetic type have a considerable margin between the operate current and the release current. For the narrow margins assumed above, it will be necessary to eliminate the effects of this so that the relay margin is effectively zero. This may be done by associating a hold-up circuit with the alarm relay AR which causes it to release after a specified time. The relay current must then be brought up to the full operate value in order to pull it up again. This function is performed by the circuits associated with condensers 26 and 27 as explained in the preceding section.

The particular circuit arrangement illustrated in Fig. 1 was designed for use with a radar system in which only about 20 echoes will be received from a target on a single scan. Of these, about ten will have an amplitude within one decibel of the maximum. Since at least five echoes are needed in succession to operate the alarm, the blanking effect of the alarm multivibrator must not be so great that there would be much chance of the first five echoes all being blanked out. These conditions determine the choice of the interval $b$. This time for the circuit elements used is equal to about 285 microseconds and the pulse rate is 1000 cycles. Equation 6 can be solved for the minimum signal-to-noise ratio showing that S will be equal to 7.17 decibels. Tests of the circuit of Fig. 1 show that it will operate on signals of about this level, and they thus provide a check of the theoretically derived formulae above.

Inspection of Equation 6 reveals that it is independent of the pulse period, and this would also hold true if $b$ referred to a scanning range gate ahead of the alarm multivibrator, such as illustrated in Fig. 3. Thus, by employing the latter expedient, the minimum signal-to-noise ratio required for operation of the alarm circuit may be reduced as much as desired, but, of course, at the expense of the resolving time of the alarm circuit.

Fig. 3 shows a modified (scanning gate) alarm arrangement in accordance with the invention for providing in addition to an automatic alarm for calling the attention of the operator when an indication representing an echo from an object within the desired range of the radar system is received on the indicator screen, an automatic indication to the operator of the range, that is, the distance to the object or target causing the echo.

In the system of Fig. 3, the alarm multivibrator, the amplifier driven by that multivibrator, the alarm relay in the output of the amplifier and the associated alarm lamp are essentially the same as those elements in the arrangement of Fig. 1 as indicated by the use of similar characters in Fig. 3 for identifying them, except for the use of a pentode instead of a triode in the amplifier A, and their operation is similar to that of the corresponding elements in the system of Fig. 1 described above.

In the system of Fig. 3, the blanking multivibrator BM of the system of Fig. 1 is not used but it is replaced by the "delay" multivibrator DM and the following "range gate" multivibrator RGM, both of which are of the "start-stop" unsymmetrical type like the multivibrators in the system of Fig. 1. As indicated by the legend over the dot-dash line A—A', the arrangement of Fig. 3 is controlled through the circuit 30 and 32 from a radar such as shown diagrammatically above the corresponding dot-dash line A—A' in the system of Fig. 1.

The delay multivibrator DM has a circuit essentially like that of the blanking multivibrator BM in the system of Fig. 1, and, like the latter multivibrator, is adapted to be triggered off at the same time that the radar transmitter sends out a pulse, by a positive trigger pulse applied from the transmitting pulse generator through the trigger input circuit 30 to the control grid circuit of its left-hand (input) triode. The delay multivibrator DM generates a square wave the duration of which varies linearly with the uniformly varying direct current voltage applied to its left-hand synchronizing grid $g_6$ from the associated direct-current supply circuit through the adjustable potentiometer AP. The arm 31 of that potentiometer is rotated at constant speed through the reduction gearing RG from the shaft of the motor M to provide that linearly varying direct current voltage.

The square wave output of the delay multivibrator DM appearing in the plate circuit of its output triode is differentiated by the RC circuit comprising the condenser $C_1$ and the resistance $R_1$ to produce a pulse wave having in each cycle a positive and a negative pip, as indicated by the curve shown just above the resistance $R_1$ in Fig. 3. The second or negative pip in each cycle of the resulting pulse wave is delayed with respect to the first or positive pip (which is coincident with the trigger pulse applied from the radar transmitter) by an amount determined by the varying direct current voltage applied to the delay multivibrator DM. The wave in the output of the circuit $C_1$, $R_1$ is applied to the grid $g_6$ of the input triode of the "range gate" multivibrator RGM through a condenser $C_3$, the negative or second pip of each applied pulse causing operation of the multivibrator RGM, in a manner similar to that described for the alarm multivibrator AM in the system of Fig. 1. Such operation produces in the plate circuit of the left-hand triode a pedestal "gating" pulse, as indicated by the curve to the right of the multivibrator RGM, which is of a few microseconds (say, 10 microseconds) duration corresponding to the desired range, the length of which is determined by the time delay between the positive and negative pips in the controlling wave. The "gating" pulses pass from the plate $p_8$ of the left-hand (output) triode of the range gate multivibrator RGM through condenser $C_2$ and the resistance $R_2$ in series to the control grid $g_1$ of the left-hand (input) triode of the alarm multivibrator AM causing that grid to be driven positive during each pulse interval, that is, while the range gate is on. Thus, the sensitivity of the alarm multivibrator AM is increased during that interval so as to allow its operation by the video signals applied to the control grid circuit of its input triode through the trigger input circuit 32 from the output of the video amplifier VA in the radar receiver. At all other times the sensitivity of the alarm multivibrator AM is reduced so as to prevent its operation by the applied video signals (echoes and noise peaks of amplitude above the threshold operating value).

In the manner which has been described in connection with the similar arrangement of Fig. 1, the operation of the alarm multivibrator AM at the signal pulse frequency will cause the alarm relay AR in the output of the amplifier A driven by the multivibrator, to flash the alarm lamp AL to indicate the receipt of an echo pulse to the operator, whereas operation of the alarm multivibrator AM at lower frequencies corresponding to the relatively random applied noise peaks will not result in the operation of the alarm relay AR to flash the alarm lamp AL. Thus, the range gate arrangement in the system of Fig. 3, just described, takes the place of the blanking multivibrator BM in the system of Fig. 1, and blanks the alarm multivibrator most of the time thereby cutting down the total number of noise peaks which may operate the alarm multivibrator. Obviously, the probability that there will be a noise peak applied to the alarm multivibrator AM in the 10-microsecond intervals in which it is rendered sensitive by the applied "gating" pulses, sufficiently high to operate the alarm lamp AL is much less than the same probability for the nearly 1,000 microseconds pulse interval provided by the blanking multivibrator BM in the system of Fig. 1.

The motor M drives the arm of the adjustable potentiometer AP around at such a speed that the range gate is moved along in time and hence in range at a uniform rate which amounts to the width or duration of the gate per transmitted pulse. A circular dial D graduated in miles or yards range, near the alarm lamp AL, is attached to the shaft of the adjustable potentiometer AP so as to be rotated also by motor M. Since the dial D moves at the same speed as the arm of the potentiometer AP, the reading of the range on the dial through the window W in the screen S when the alarm lamp AL flashes to illuminate the dial, is at all times the same as the range of the range gate. For example, suppose that the range gate is one mile in width, i. e., 10 microseconds duration, and the range in which the range gate happens to be at the moment is fifteen miles, then the reading on the dial through the window near the alarm lamp AL will be fifteen miles. If there is an echo at this range, the lamp AL will be flashed for every revolution of the dial to enable the range of the object causing the echo to be read through the window for each revolution of the dial.

Now, in order not to miss an echo, the scanning gate must move not more than its width or duration (10 microseconds) between pulses and this slows up the action. The scanning range gate moves relatively slowly throughout the working range of the radar in a cyclic fashion and the light will therefore flash at intervals equal to this cycle.

In some cases it might be desired only to determine the range of the object or target reflecting the transmitted pulses, in which case the equipment shown in Fig. 3 might be employed in place of the video amplifier, sweep circuit and the cathode-ray tube in the radar. Various other modifications of the circuits illustrated and described within the spirit and scope of the invention will occur to persons skilled in the art.

What is claimed is:

1. An echo alarm circuit for use with an object locating system of the pulse reflection type including a transmitter for sending out short pulses of signal energy at a given frequency of repetition and a receiver for detecting echo pulses reflected from objects on which the transmitted signal pulses impinge, said receiver being subject to noise disturbances, comprising a multivibrator fed with a portion of the wave output of said receiver, said multivibrator being operatively responsive to each echo pulse or noise peak in the supplied waves of amplitude above a given threshold value to generate a voltage pulse, means controlled by the voltage pulses so generated for producing a current the average magnitude of which is proportional to the frequency of operation of said multivibrator and alarm means supplied with said current and adapted to be operated in response to an amount thereof produced by multivibrator operation at said given frequency by applied echo pulses and to be unresponsive to the smaller amount of said current produced by multivibrator operation at a lower frequency by relatively random noise peaks.

2. In a pulse reflection object locating system including a transmitter for sending out recurring signal wave pulses and a receiver for detecting echoes of said pulses reflected from objects to be located, subject to noise disturbances, a multivibrator supplied with a portion of the detected wave output of said receiver and operatively responsive to the supplied waves having an amplitude above a given threshold value, whether noise peaks or signal echoes, an amplifier driven by said multivibrator so as to produce an average output current proportional to the frequency of operation thereof, relay means supplied with said amplifier output current and operatively responsive to the amount thereof produced by multivibrator operation at the frequency of recurrence of said signal pulses but unresponsive to the amount of amplifier output current produced by multivibrator operation at lower frequencies due to relatively random noise peaks, and alarm means responsive to operation of said relay means.

3. In combination with a pulse reflection type object locating system including a transmitter for sending out signal wave pulses at regularly recurring time intervals and a receiver for picking up and detecting echoes of said pulses reflected from objects to be located on which the transmitted pulses impinge, an alarm device, a control device supplied with a portion of the detected wave output of said receiver, said control device being operatively responsive to the echo pulses of amplitude levels above a given value in the supplied wave to operate said alarm device but being unresponsive to the less frequently occurring noise peaks therein of the same or higher amplitude levels, other means responsive to a portion of the wave energy generated by said transmitter each time it sends out a signal pulse to apply a control bias to said control device, and means for controlling the time of application of said bias to said control device so that said alarm device is operated thereby substantially only in response to echoes of the signal pulses reflected from objects within a given distance range from said receiver.

4. In combination with a pulse reflection type object locating system including a transmitter for sending out alternating wave pulses of very short duration at a given frequency of repetition, a receiver at the same location for picking up and detecting return pulses or echoes of the transmitted pulses reflected from objects to be located, and an indicator synchronized from said transmitter for producing a pattern of the detected pulses along a time scale on a screen to indicate the time interval elapsing between the emission of each transmitted pulse and the receipt at the receiver of the echoes thereof as a measure of the distances to the objects causing the echoes, means for automatically indicating to the operator of said system when the representation of an echo reflected from an object within a given range appears on the screen, comprising a multivibrator adapted to be triggered off by a portion of the wave output of said receiver, having an amplitude level above a given threshold value, whether comprising detected signal echoes or noise peaks, an amplifier driven by said multivibrator so as to produce an average output current proportional to the frequency of operation of said multivibrator, alarm means operatively responsive to the amplifier output current produced by multivibrator operation at said given frequency of repetition of the transmitted pulses and unresponsive to the amplifier output current produced by operation of said multivibrator at a lower frequency such as would be produced by relatively random noise peaks, and a second multivibrator controlled by a portion of the wave energy generated by said transmitter each time it sends out a pulse, operating to control the sensitivity of said first multivibrator so as to prevent operation of said alarm means in response to the remnant of each transmitted pulse getting through said receiver or in response to echoes of each transmitted pulse reflected from objects outside the desired scanning range of said receiver.

5. The combination of claim 3 in which said control device comprises a multivibrator adapted to be triggered off by all wave energy in the output of said receiver, of an amplitude level above a given threshold value, whether produced by received echoes or noise peaks, an amplifier driven by said multivibrator so as to produce an average output current proportional to the frequency of operation of said multivibrator, and relay means operatively responsive to the amplifier output current produced by multivibrator operation at the frequency of recurrence of the transmitted signal wave pulses to actuate said alarm device, and unresponsive to the amplifier output current produced by operation of said multivibrator at lower frequencies caused by applied relatively random noise peaks, said other means comprises means triggered off by each said portion of the wave energy generated by said transmitter, for generating and applying as a positive bias to said multivibrator a gating pulse and the last-mentioned means comprises means for so controlling the duration of each applied gating pulse that said multivibrator will be rendered sensitive enough to be operated by applied echoes during periods in which they are received from objects within said given distance range from said receiver and its sensitivity will be reduced at all other times to a value such as to prevent operation by applied echoes.

6. A range indicator for use with an object locating system including a transmitter for sending out wave pulses of short duration at regularly recurring time intervals and a receiver at the same location for picking up and detecting return echoes reflected from the objects on which the transmitted pulses impinge, said range indicator comprising wave-operated control means supplied with wave energy from the output of said receiver and adapted to be completely operated by the regularly recurring signal echoes therein only, an alarm lamp operatively responsive to complete operation of said control means, a multivibrator which is triggered off each time said transmitter sends out a pulse, by a positive trigger pulse supplied therefrom, and is controlled by a uniformly varying direct current voltage applied as a bias thereto, so as to generate a square wave the duration of which varies linearly with said direct current voltage, a direct-current supply circuit for said multivibrator including a motor, an adjustable potentiometer the adjustable arm of which is rotated at constant speed by said motor to produce said varying direct current biasing voltage, means for differentiating the generated square wave so as to produce a pulse wave having in each cycle a positive and a following negative pip the time delay of which with respect to the positive pip which is coincident with the controlling trigger pulse from said transmitter, is determined by said direct current voltage, another multivibrator operating as a range gate, supplied with said pulse wave and actuated by each negative pip thereof to produce a positive pedestal pulse of short duration corresponding to the desired range, the length of which is determined by said time delay, means for applying said positive pedestal pulse as a positive bias to said control means to increase its sensitivity during the period of pulse application only, to the point where it will be operated by each applied echo to flash said alarm lamp, a screen with a window therein illuminated by said lamp when it flashes and a dial graduated in range units rotated by said motor past said window at the same speed as said arm of said potentiometer so that the range of an object producing an echo is indicated on the illuminated dial through said window at each revolution of said dial when said alarm lamp flashes to indicate the receipt of said echo.

ALBERT M. SKELLETT.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,286,377 | Roberts | June 16, 1942 |
| 2,299,252 | Pierce | Oct. 20, 1942 |
| 2,323,596 | Hansell | July 6, 1943 |
| 2,403,527 | Hershberger | July 9, 1946 |
| 2,406,316 | Blumlein et al. | Aug. 27, 1946 |
| 2,416,088 | Deerhake | Feb. 18, 1947 |

FOREIGN PATENTS

| Number | Country | Date |
|---|---|---|
| 113,233 | Australia | June 2, 1941 |